United States Patent
Zhang et al.

(10) Patent No.: US 12,225,084 B2
(45) Date of Patent: Feb. 11, 2025

(54) COMMUNICATION METHOD AND RELATED COMPONENTS

(71) Applicant: IEIT SYSTEMS CO., LTD., Shandong (CN)

(72) Inventors: Kai Zhang, Shandong (CN); Jie Li, Shandong (CN); Zaigui Zhang, Shandong (CN)

(73) Assignee: IEIT SYSTEMS CO., LTD., Shandong (CN)

(*) Notice: Subject to any disclaimer, the term of this patent is extended or adjusted under 35 U.S.C. 154(b) by 0 days.

(21) Appl. No.: 18/725,102

(22) PCT Filed: Feb. 24, 2023

(86) PCT No.: PCT/CN2023/078090
§ 371 (c)(1),
(2) Date: Jun. 27, 2024

(87) PCT Pub. No.: WO2023/236589
PCT Pub. Date: Dec. 14, 2023

(65) Prior Publication Data
US 2024/0422218 A1    Dec. 19, 2024

(30) Foreign Application Priority Data

Jun. 6, 2022  (CN) .......................... 202210627358.1

(51) Int. Cl.
*H04L 12/24*  (2006.01)
*H04L 41/0803*  (2022.01)
*H04L 67/1097*  (2022.01)

(52) U.S. Cl.
CPC ............................. *H04L 67/1097* (2013.01)

(58) Field of Classification Search
CPC .................................................. H04L 67/1097
(Continued)

(56) References Cited

U.S. PATENT DOCUMENTS

| | | | | |
|---|---|---|---|---|
| 6,631,140 B1 * | 10/2003 | Sjodin | ...................... | H04W 8/10 370/469 |
| 8,527,661 B1 * | 9/2013 | Lee | ........................ | H04L 67/568 709/217 |

(Continued)

FOREIGN PATENT DOCUMENTS

| | | | |
|---|---|---|---|
| CN | 102404212 A | * | 4/2012 |
| CN | 107147722 A | | 9/2017 |

(Continued)

OTHER PUBLICATIONS

Song, Hexiang. "Research on Construction of RDMA End-host System for Multi-application Datacenters." A thesis for master's degree. Nanjing University. May 15, 2022.

(Continued)

*Primary Examiner* — Moustafa M Meky
*Assistant Examiner* — Elizabeth Kassa
(74) *Attorney, Agent, or Firm* — IPro, PLLC (57) ABSTRACT

Disclosed are a communication method and related components. In this solution, two network stacks are firstly established, and all connection relationships between a client and each server node and between processes of any two server nodes are then divided, so as to obtain two kinds of connection relationships, wherein the two kinds of connection relationships are respectively constructed on the basis of the two network stacks, and the number of one of the two kinds of connection relationships is related to the number of QPs.

20 Claims, 3 Drawing Sheets

(58) Field of Classification Search
USPC .......................................................... 709/201
See application file for complete search history.

(56) References Cited

U.S. PATENT DOCUMENTS

| | | | | |
|---|---|---|---|---|
| 8,583,903 | B2* | 11/2013 | Freedman | B82Y 10/00 |
| | | | | 706/62 |
| 8,874,680 | B1* | 10/2014 | Das | H04L 67/568 |
| | | | | 711/119 |
| 9,806,984 | B1* | 10/2017 | Tolstoy | H04L 45/745 |
| 10,687,263 | B2* | 6/2020 | Paladugu | H04W 12/04 |
| 11,388,642 | B2* | 7/2022 | Paladugu | H04W 12/033 |
| 2002/0198927 | A1 | 12/2002 | Craddock et al. | |
| 2003/0182398 | A1* | 9/2003 | Morlang | H04L 67/08 |
| | | | | 709/219 |
| 2004/0010594 | A1 | 1/2004 | Boyd et al. | |
| 2005/0276281 | A1* | 12/2005 | Jones | H04L 69/16 |
| | | | | 370/469 |
| 2009/0067440 | A1* | 3/2009 | Chadda | H04L 63/0227 |
| | | | | 370/401 |
| 2012/0066695 | A1* | 3/2012 | Berezansky | H04L 61/251 |
| | | | | 719/328 |
| 2013/0103853 | A1* | 4/2013 | Lyon | H04L 67/10 |
| | | | | 709/238 |
| 2016/0028806 | A1* | 1/2016 | Wareing | H04L 67/1095 |
| | | | | 709/217 |
| 2016/0034418 | A1* | 2/2016 | Romem | H04L 12/6418 |
| | | | | 709/212 |
| 2016/0337902 | A1* | 11/2016 | Hahn | H04L 67/02 |
| 2017/0034268 | A1 | 2/2017 | Govind | |
| 2017/0075856 | A1* | 3/2017 | Suzue | H04L 67/1001 |
| 2017/0103039 | A1* | 4/2017 | Shamis | H04L 49/103 |
| 2017/0149890 | A1* | 5/2017 | Shamis | H04L 67/1097 |
| 2017/0371835 | A1 | 12/2017 | Ranadive et al. | |
| 2019/0253945 | A1* | 8/2019 | Paladugu | H04W 76/27 |
| 2020/0344657 | A1* | 10/2020 | Paladugu | H04W 12/04 |
| 2021/0081268 | A1* | 3/2021 | Bando | H04L 69/40 |
| 2021/0303154 | A1* | 9/2021 | Zhang | G06F 3/0685 |
| 2022/0400422 | A1* | 12/2022 | Paladugu | H04W 36/185 |
| 2023/0239350 | A1* | 7/2023 | Chen | H04L 67/1097 |
| | | | | 709/213 |

FOREIGN PATENT DOCUMENTS

| | | |
|---|---|---|
| CN | 107451092 A | 12/2017 |
| CN | 107948334 A | 4/2018 |
| CN | 110113425 A | 8/2019 |
| CN | 110445666 A | 11/2019 |
| CN | 111277616 A | 6/2020 |
| CN | 113326155 A | 8/2021 |
| CN | 114710515 A | 7/2022 |

OTHER PUBLICATIONS

Xingda Wei, et al. "Optimizing distributed systems with remote direct memory access." Big Data. Issue 04, 2018.
Qing Ye, et al. "Research of message passing technology based on infiniband architecture." Journal of Sichuan University (Natural Science Edition), 52(2). Mar. 28, 2015.

* cited by examiner

COMMUNICATION METHOD AND RELATED COMPONENTS

CROSS REFERENCE TO RELATED APPLICATION

The present application claims the priority of the Chinese patent application 202210627358.1 titled "COMMUNICATION METHOD AND RELATED COMPONENTS" filed in China National Intellectual Property Administration on Jun. 6, 2022, which is incorporated herein by reference in their entirety.

TECHNICAL FIELD

The present application relates to the field of communication, and in particular to a communication method and related components.

BACKGROUND

At present, remote direct memory access (RDMA) technology is mainly applied to information button (IB) cards and distributed storage systems. However, the limitation on the number of quantization parameters (QPs) corresponding to the RDMA technology limits its application in communication design. When the RDMA technology is applied to a single IB card, there is an upper limit on the number of QPs created by the single IB card. If excessive QPs are created, the performance of the IB card will degrade to a certain extent. When the RDMA technology is applied to the existing distributed storage systems, most distributed storage systems adopt a multi-process concurrency, connections between different server nodes (the server nodes refer to server nodes that may perform data communication) are complete cross-connections (connections are almost established between processes in each server node and processes in other server nodes), and the number of such connections is positively correlated with the number of QPs. Since the number of connections increases as the number of server nodes increases, the number of QPs reaches the upper limit easily. The distributed storage system has the advantage of good scalability, and the limitation on the number of QPs limits the scalability of the distributed storage system, resulting in a conflict.

The main core of solving the above problems in the conventional technology is to reduce the number of connections, which mainly adopt the following two methods.

The first method is a single-process multi-thread method. Compared with the current multi-process method, an architecture for the single-process multi-thread method changes significantly. In addition, if the process crashes, the whole server node may not provide services to the outside, resulting in poor stability.

In the second method, the current multi-process method is retained, a network proxy layer is added between the client and each server node, and all data between the client and each server node is transmitted through the network proxy layer. However, in this method, the length of the IO (Input/Output) stack increases, which may consume the benefits brought by the RDMA technology, such as reducing the performance or the communication efficiency of the distributed storage system.

SUMMARY

The objective of the present application is to provide a communication method and related components, which achieve communications between the client and each server node and between processes of any two server nodes by using two network stacks. For the whole distributed storage system, the number of QPs to may be reduced to a certain extent, and the performance and communication efficiency of the distributed storage system may be improved.

In order to solve the above technical problems, the present application provides a communication method applied to a distributed storage system which includes a client and a plurality of server nodes, and the method includes:

establishing a first network stack and a second network stack; and dividing all connection relationships between the client and each server node and between processes of any two server nodes to obtain a first connection relationship and a second connection relationship, so that communications between the client and each server node and between the processes of any two server nodes are based on a corresponding connection relationship;

wherein the first connection relationship is established based on the first network stack, and the second connection relationship is established based on the second network stack; and a number of first connection relationships or second connection relationships is related to a number of quantization parameters (QPs).

In some embodiments, dividing all connection relationships between the client and each server node and between processes of any two server nodes to obtain the first connection relationship and the second connection relationship, so that communications between the client and each server node and between processes of any two server nodes are based on a corresponding connection relationship, includes:

dividing a connection relationship between the client and each server node into the first connection relationship, so that communication between the client and each server node is based on the first connection relationship; and dividing a connection relationship between processes of any two server nodes into the second connection relationship, so that communication between processes of any two server nodes is based on the second connection relationship.

In some embodiments, the number of first connection relationships established based on the first network stack is related to the number of QPs, and the number of second connection relationships established based on the second network stack is not related to the number of QPs.

In some embodiments, the first network stack is an RDMA network stack and the second network stack is a Posix network stack.

In some embodiments, the distributed storage system further includes a monitoring terminal for monitoring an operating state of each server node, and the method further includes:

dividing a connection relationship between the monitoring terminal and each server node into the first connection relationship, so that the monitoring terminal monitors each server node based on the first connection relationship.

In some embodiments, the monitoring terminal is a display.

In some embodiments, the first network stack is an RDMA network stack.

After the dividing the connection relationship between the client and each server node into the first connection relationship, so that communication between the client and each server node is based the first connection relationship, the method further includes:
  determining an amount of data transmitted between the client and each server node;
  determining whether the amount of data is within a preset range;
  controlling the client to transmit data to each server node through a bilateral primitive when the amount of data is within the preset range; and
  controlling the client to transmit data to all server nodes through a unilateral primitive when the amount of data is not within the preset range.

In some embodiments, the server nodes include a main server node and a plurality of sub-server nodes.

The controlling the client to transmit data to each server node through the bilateral primitive, includes:
  controlling the client to transmit data to the main server node through the bilateral primitive, and then controlling the main server node to transmit data to the sub-server nodes.

In some embodiments, before the controlling the client to transmit data to all server nodes through the unilateral primitive, the method further includes:
  controlling the client to send its own memory address and secret key to each server node through the bilateral primitive; and
  controlling each server node to pull data from the memory address corresponding to the client based on the memory address and the secret key for data transmission between the client and each server node.

In some embodiments, after the controlling each server node to pull data from the memory address corresponding to the client based on the memory address and the secret key, the method further includes:
  storing the pulled data in a memory address of each server node corresponding to the data.

In some embodiments, the first network stack is an RDMA network stack.

After the dividing the connection relationship between the client and each server node into the first connection relationship, so that communication between the client and each server node is based on the first connection relationship, the method further includes:
  determining a type of data transmitted by the client to the server nodes;
  determining whether the type of data is a preset type;
  controlling the client to transmit data to each server node through the bilateral primitive when the type of data is the preset type; and
  controlling the client to transmit the preset type of data to all server nodes through the unilateral primitive when the type of data is not of the preset type.

In order to solve the above technical problems, the present application also provides a communication system applied to a distributed storage system which includes a client and a plurality of server nodes, and the system includes:
  an establishment unit for establishing a first network stack and a second network stack; and
  a dividing unit for dividing all connection relationships between the client and each server node and between processes of any two server nodes to obtain a first connection relationship and a second connection relationship, so that communications between the client and each server node and between processes of any two server nodes are based on a corresponding connection relationship;
  wherein the first connection relationship is established based on the first network stack, and the second connection relationship is established based on the second network stack; and
  a number of first connection relationships or second connection relationships is related to a number of quantization parameters (QPs).

In order to solve the above technical problems, the present application also provides a communication apparatus, including:
  a memory for storing a computer program; and
  a processor for implementing steps of the above communication method when the computer program is stored.

In order to solve the above technical problems, the present application also provides a non-transitory readable storage medium which stores a computer program. The computer program implements steps of the above communication method when executed by a processor.

In order to solve the above technical problems, the present application also provides a distributed storage system including a client, a plurality of server nodes and the above communication apparatus.

The present application provides a communication method applied in the field of communication. In this solution, two network stacks are first established, and then all connection relationships between the client and each server node and between processes of any two server nodes are divided to obtain two connection relationships. The two connection relationships are established based on the two network stacks respectively. The number of one of the two connection relationships is related to the number of QPs. Therefore, compared with solutions in the conventional technology, the present application uses two network stacks to achieve communications between the client and each server node and between the processes of any two server nodes. For the whole distributed storage system, the number of QPs may be reduced to a certain extent, and the performance and communication efficiency of the distributed storage system may be improved.

The present application also provides a communication system, an apparatus, a non-transitory computer-readable storage medium and a distributed storage system, which have the same beneficial effects as the above communication method.

BRIEF DESCRIPTION OF THE DRAWINGS

In order to more clearly illustrate the technical solutions of the embodiments of the present disclosure or the prior art, the figures that are required to describe the embodiments or the prior art may be briefly introduced below. Apparently, the figures that are described below are embodiments of the present disclosure, and a person skilled in the art may obtain other figures according to these figures without paying creative work.

DEEMPENNAGEED DESCRIPTION OF THE EMBODIMENTS

The core of the present application is to provide a communication method and related components, which achieve communications between the client and each server node and between processes of any two server nodes by using two network stacks. For the whole distributed storage system, the number of QPs may be reduced to a certain extent, and the performance and communication efficiency of the distributed storage system may be improved.

In order to make the objects, the technical solutions and the advantages of the embodiments of the present disclosure clearer, the technical solutions of the embodiments of the present disclosure may be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
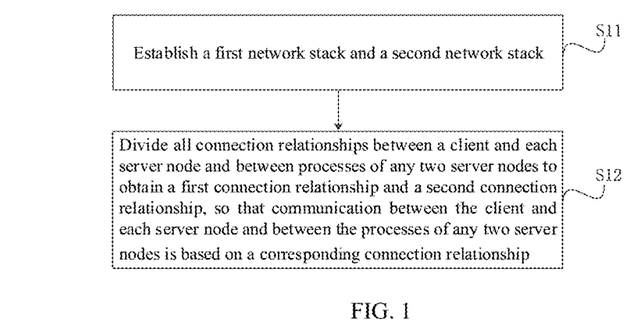
FIG. 1 is a schematic flowchart of a communication method provided in the present application.

Please refer to FIG. 1, which is a schematic flowchart of a communication method provided in the present application. The method is applied to a distributed storage system which includes a client and a plurality of server nodes. The method includes:

S11: establishing a first network stack and a second network stack; and

S12: dividing all connection relationships between the client and each server node and between processes of any two server nodes to obtain a first connection relationship and a second connection relationship, so that communications between the client and each server node and between processes of any two server nodes are based on a corresponding connection relationship.

The first connection relationship is established based on the first network stack, and the second connection relationship is established based on the second network stack.

A number of first connection relationships or second connection relationships is related to the number of quantization parameters (QPs).

In order to solve the problem of excessive QPs in the distributed storage system in the conventional technology, the solution in the present application is to establish two different network stacks in advance and divide all connection relationships in the distributed storage system into two categories, i.e., a first connection relationship and a second connection relationship. Since the first connection relationship is established based on the first network stack and the second connection relationship is established based on the second network stack, all connection relationships in the distributed storage system are the first connection relationship and the second connection relationship established based on the two network stacks respectively. Furthermore, since one of the first connection relationship and the second connection relationship in the present application is related to the number of QPs and the other is not related to the number of QPs, it is assumed that the first connection relationship is related to the number of QPs and the second connection relationship is not related to the number of QPs.

The connections between the client and each server node and between processes of any two server nodes may affect the number of QPs only when they are based on the first connection relationship, which reduces the number of connection relationships related to the number of QPs to a certain extent and reduce the number of QPs, improves the scalability and performance of the distributed storage system to a certain extent, and also improves the performance of the distributed storage system.

Furthermore, the first network stack and the second network stack in the present application correspond to the first connection relationship and the second connection relationship respectively. Which one is related to the number of QPs and which one is not related to the number of QPs are not limited herein.

Furthermore, regardless of the connection relationship established in the present application, it is necessary to ensure normal communications between the client and each server node and between processes of each server node.

It should be noted that in the present application, in addition to the client, a monitoring terminal (such as a display, etc.) may communicate with the server node.

In summary, the communication method in the present application achieves communications between the client and each server node and between processes of any two server nodes by using two network stacks. For the whole distributed system, the number of QPs may be reduced to a certain extent, and the performance and communication efficiency of the distributed storage system may be improved.

Based on the above embodiment:

as an embodiment, the dividing all connection relationships between the client and each server node and between processes of any two server nodes to obtain the first connection relationship and the second connection relationship, so that communications between the client and each server node and between processes of any two server nodes are based on a corresponding connection includes:

dividing a connection relationship between the client and each server node into the first connection relationship, so that communication between the client and each server node communicate is based on the first connection relationship; and dividing a connection relationship between processes of any two server nodes into the second connection relationship, so that communication between processes of any two server nodes is based on the second connection relationship.

Furthermore, when all connection relationships in the distributed storage system are divided, in order to facilitate the division and improve the orderliness and clarity of the division, the division provided in this embodiment is as follows: the connection relationship between the client and each server node is divided into the first connection relationship, and the connection relationship between processes of each server node is divided into the second connection relationship, so as to achieve communications between the client and each server node in the distributed storage system and the communication between processes of each server node.

Of course, the above is only an implementation in the embodiment, and there may be other division relationships, which are not limited herein.

As an embodiment, the number of the first connection relationships established based on the first network stack is related to the number of QPs, and the number of the second connection relationships established based on the second network stack is not related to the number of QPs.

Figure 2:
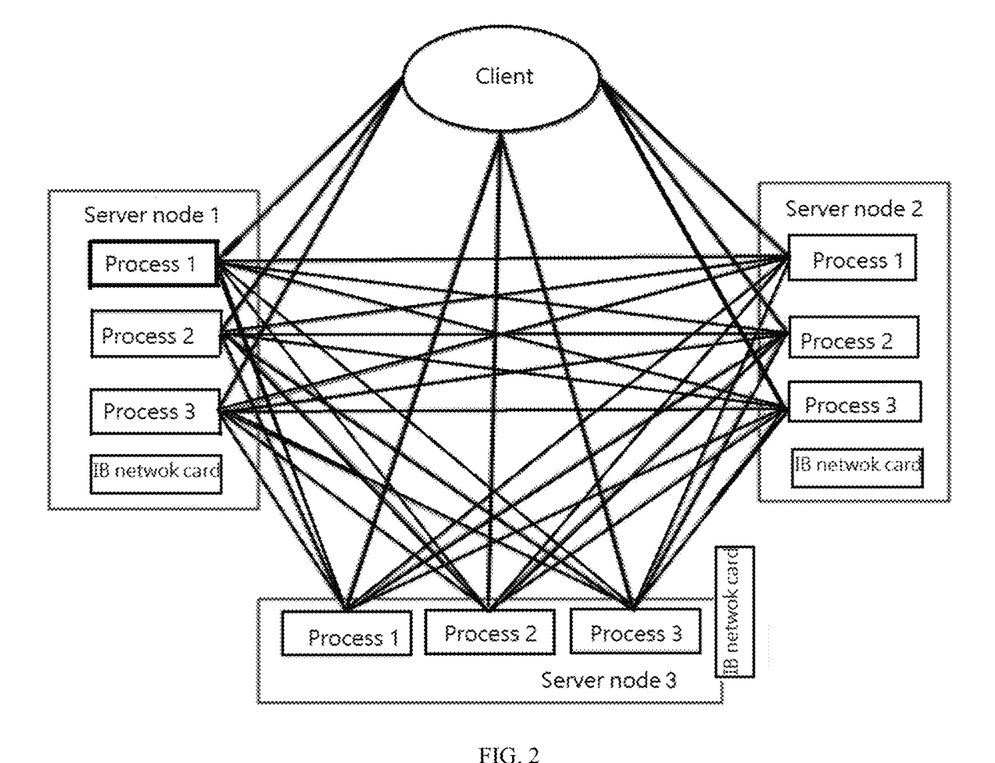
FIG. 2 is a schematic diagram of connections of a distributed storage system in the conventional technology.

Please refer to FIG. 2, which is a schematic diagram of connections of a distributed storage system in the conventional technology. There are three server nodes (e.g., three IB network cards). Process 1, process 2 and process 3 are three processes in each server node. It is assumed that the connection between the client and each server node is called an external connection, the connection between processes of each server node is called an internal connection, the number of server nodes is N, and the number of processes in each server node is P, then in the distributed storage system, the number of external connections is $To=N*P$, the number of internal connections is $Ti=P*(N-1)*P=(N-1)*P^2$, and the total number of connections is $T=N*P+(N-1)*P^2$. It may be seen that the number of internal connections increases exponentially with the increase in the number of server nodes and the number of processes in the server nodes, resulting in a significant increase in the number of QPs. It may also be said that the number of internal connections is directly related to the number of QPs.

Therefore, in the embodiment, in order to effectively reduce the number of QPs in the distributed storage system, the second connection relationship between processes of each server node is limited to a connection relationship that is not related to the number of QPs. When each connection relationship in the distributed storage system is established by the above method, only the first connection relationship between the client and each server node is related to the number of QPs, and the second connection relationship between processes of each server node is not related to the number of QPs. Even if the number of server nodes or the number of processes in the server nodes increases, only an increase in the number of first connection relationships is related to the number of QPs, and an increase in the number of second connection relationships is not related to the number of QPs. When the number of server nodes increases, the increase in the number of first connection relationships is relatively small compared to the increase in the number of second connection relationships. Therefore, even if the increase in the number of first connection relationships is relatively large, the increase in the number of QPs will not be too large, and the number of QPs may be reduced to a greater extent compared to the conventional technology.

In summary, in the embodiment, by limiting the connection relationship between processes of each server node to a connection relationship that is not related to the number of QPs, the number of QPs may be greatly reduced, and the performance and scalability of the distributed storage system may be improved.

As an embodiment, the distributed storage system further includes a monitoring terminal for monitoring an operating state of each server node, and the method further includes:
dividing a connection relationship between the monitoring terminal and each server node into a first connection relationship, so that the monitoring terminal monitors each server node based on the first connection relationship.

In some embodiments, the monitoring terminal is a display.

Further, in order to facilitate monitoring of the operating state of each server node, the present application also provides a monitoring terminal in the server system, which communicates with each server node based on the first connection relationship to achieve monitoring of each server node and facilitate the staff to understand the operating state of each server node. The implementation of the monitoring terminal may be, but is not limited to, a display.

As an embodiment, the first network stack is an RDMA network stack, and the second network stack is a Posix network stack.

Further, the embodiment is intended to limit implementations of the first network stack and the second network stack. The first network stack may be, but is not limited to, an RDMA network stack, and the second network stack may be, but is not limited to, a Posix network stack.

Figure 3:
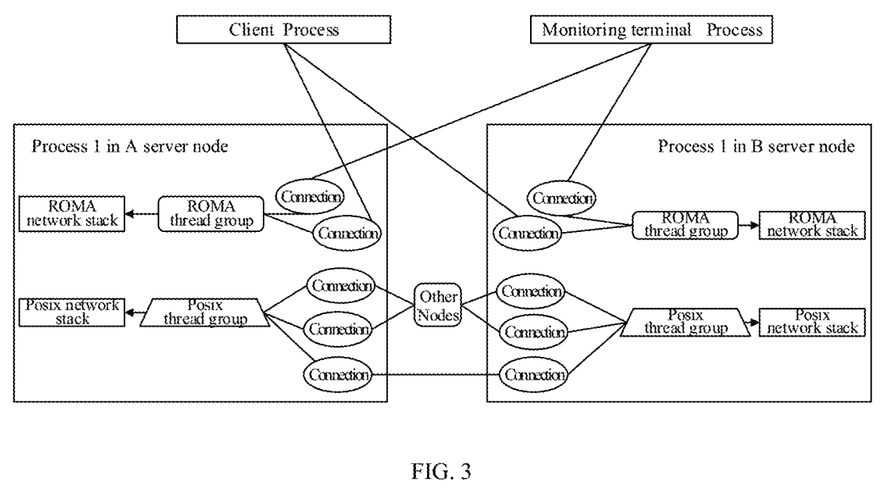
FIG. 3 is a structure schematic diagram of a dual network stack provided in the present application.

Please refer to FIG. 3 for details. FIG. 3 is a structure schematic diagram of a dual network stack provided in the present application. FIG. 3 shows connection relationships established between different processes in different server nodes (e.g., a connection relationship established between process 1 in server node A and process 1 in server node B). The monitoring terminal may be, but is not limited to, a display, etc.

At startup of the distributed storage system, two network stacks are initialized when the process starts. Each network stack has its own independent operating thread group. For the RDMA network stack, initializing a local device, a port and a memory, a registration and other actions are required. An initialization process of the Posix network stack is consistent with the initialization process of the traditional Ethernet, and will not be repeated herein.

Further, at a phase of establishing the connection relationship, a first thread group of various thread groups in the network stack detects and determines which network stack to use based on an accessed or initiated network segment (the network segment is determined by a plurality of bits in the transmitted IP). The communication between processes is based on the Posix network stack, and the communication between the client and each server node is based on the RDMA network stack. If the same network segment may be found, a network stack to which the corresponding network segment belongs will be used; if the same network segment may not be found, a network stack used by public will be used (the network stack used by public here refers to the RDMA network stack between the client and each server node). The Posix network stack establishes a connection in the same way as the traditional TCP establishes a socket connection.

The RDMA network stack first interacts with metadata (the metadata here refers to parameters or data related to QPs) through a transmission control protocol (TCP) and then communicates through QPs. After the above connection relationship is established, virtual connections in an upper layer encapsulates all communication details in a lower layer (all communication details in the lower layer refer to the first connection relationship and the second connection relationship corresponding to the first network stack and the second network stack respectively). The business logic in the upper layer is not aware of different network stacks, and the upper layer only needs to apply the connection relationship of the lower layer for communication.

The communication method through the Posix network stack is a TCP communication method of the traditional Ethernet, which will not be introduced herein.

As an embodiment, the first network stack is an RDMA network stack.

After the dividing the connection relationship between the client and each server node into the first connection relationship, so that communication between the client and each server node is based on the first connection relationship, the method further includes:

determining an amount of data transmitted between the client and the server nodes;

determining whether the amount of data is within a preset range;

controlling the client to transmit data to each server node through a bilateral primitive when the amount of data is within the preset range; and controlling the client to transmit data to all server nodes through a unilateral primitive when the amount of data is not within the preset range.

Furthermore, based on the above limitation of establishing the first connection relationship between the client and each server node through the RDMA network stack, the embodiment is intended to describe a process of communication between the client and each server node.

Communication methods of RDMA are divided into two primitives, i.e., a unilateral primitive and a bilateral primitive. The bilateral primitive has less interaction, may not reduce the involvement of the CPU in the server, and is more suitable for the transmission of small messages.

The unilateral primitive may completely avoid the involvement of the CPU, reduce data copying, and is suitable for the transmission of large blocks of data. Therefore, different communication methods are used in the present application based on the size of data (amount of data) to be transmitted.

The amount of data to be transmitted between the client and the server node is first determined. If it is within a preset range (which may be, but is not limited to, determining whether the amount of data is less than 64 kb, and if it is less than 64 kb), then it is determined to be a small message, and the client is controlled to transmit data to each server node through the bilateral primitive.

As an embodiment, the server nodes include a main server node and a plurality of sub-server nodes.

Controlling the client to transmit data to each server node through the bilateral primitive, includes:

controlling the client to transmit data to the main server node through the bilateral primitive, and then controlling the main server node to transmit data to the sub-server nodes.

Furthermore, when the server nodes are divided into the main server node and the plurality of sub-server nodes, the implementation of transmitting data between the client and each server node through the bilateral primitive is as follows: the client first transmits all data to the main server, and after the main server receives the data, it transmits the data to the sub-servers. In a specific embodiment, if not all sub-servers are required to receive the data, the main server transmits the data to only some of the sub-servers (i.e., sub-servers that are required to receive the data) after receiving the data transmitted by the client.

Figure 4:
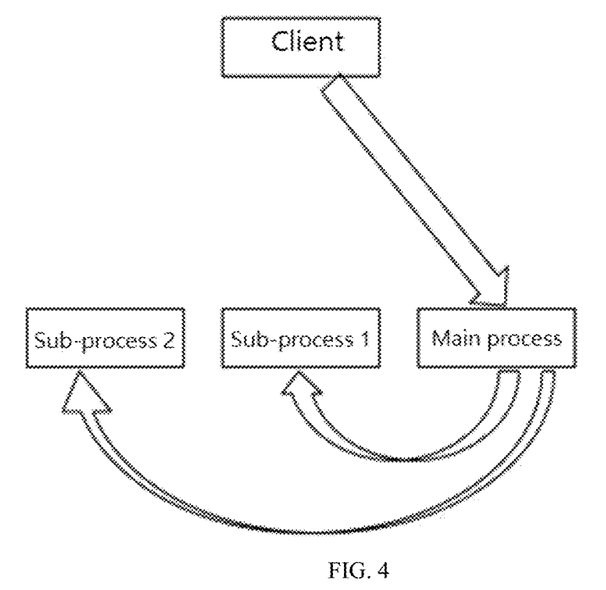
FIG. 4 is a structure schematic diagram of a bilateral primitive transmission provided in the present application.

Please refer to FIG. 4, which is a structure schematic diagram of a bilateral primitive transmission provided in the present application. A main process, sub-process 1 and sub-process 2 represent processes in three different server nodes, respectively. The client sends a message to the main process, and then the main process sends the message to other sub-processes to achieve data transmission between the client and each server node. There may be copy replication or calculation step during the data transmission, which occupy the CPU to perform the replication or calculation step. Therefore, small messages may be transmitted. If large messages are transmitted, the CPU consumption will greatly increase.

If it is not within the preset range (which may be, but is not limited to, determining whether the amount of data is less than 64 kb, and if it is not less than 64 kb), it is determined to be a large block of message. The client is controlled to transmit data to the server nodes through the unilateral primitive. Please refer to FIG. 5, which is a structure schematic diagram of a unilateral primitive transmission provided in the present application. A main process, sub-process 1 and sub-process 2 represent different processes in three different server nodes, respectively. An implementation of data transmission between the client and each server node is that each server node pulls data from the client, and is not that the client sends a message to each server node. The process of pulling data does not occupy the CPU, which reduces the CPU consumption. In addition, transmitting large blocks of data through the bilateral primitive may also accelerate data transmission speed and efficiency.

As an embodiment, before the controlling the client to transmit data to all server nodes through the unilateral primitive, the method further includes:

controlling the client to send its own memory address and secret key to each server node through the bilateral primitive; and controlling each server node to pull data from the memory address corresponding to the client based on the memory address and the secret key for data transmission between the client and the server nodes.

Furthermore, the embodiment is intended to limit an implementation of data transmission between the client and each server node through the unilateral primitive. Before data is transmitted through the unilateral primitive, the memory address and the secret key of the client are first transmitted to each server node through the bilateral primitive (the amount of data of the memory address and the secret key is small, so the bilateral primitive is used), and then each server node accesses data in the memory address corresponding to the client based on the received memory address and the secret key, and directly pulls it. In this process, the CPUs in the server nodes are not required to be used, and the CPU consumption may be reduced.

As an embodiment, after the controlling each server node to pull data from the memory address corresponding to the client based on the memory address and the secret key, the method further includes:

storing the pulled data in a memory address of each server node corresponding to the data.

Furthermore, after each server node pulls the data, it may store the data directly in its own (server node's) memory address. In this way, when the data stored in the server node is required to be called, the corresponding memory address may be directly accessed. The CPUs in the server nodes are not required to perform the replication step, and the CPU occupation may be reduced.

It should be noted that the large message and the small message described in the embodiment refer to a message with a large amount of data and a message with a small amount of data. The message may be data or a signal, etc., which are not limited herein.

It may be seen from the above that determining the amount of data to determine different data transmissions may reduce the CPU occupation and accelerate data transmission speed and efficiency.

As an embodiment, the first network stack is an RDMA network stack.

After the dividing the connection relationship between the client and each server node into the first connection relationship, so that communication between the client and each server node is based on the first connection relationship, the method further includes:
- determining a type of data transmitted by the client to the server nodes;
- determining whether the type of data is a preset type;
- controlling the client to transmit the preset type of data to each server node through the bilateral primitive when the type of data is the preset type; and
- controlling the client to transmit the preset type of data to all server nodes through the unilateral primitive when the type of data is not the preset type.

Furthermore, based on the above limitation of establishing the first connection relationship between the client and each server node based on the RDMA network stack, the embodiment is intended to describe a process of communication between the client and each server node.

Communication methods of RDMA are divided into two primitives, i.e., a unilateral primitive and a bilateral primitive. The bilateral primitive has less interaction, may not reduce the involvement of the CPU in the server, and is more suitable for the transmission of small messages.

The unilateral primitive may completely avoid the involvement of the CPU, reduce data copying, and is suitable for the transmission of large blocks of data. Therefore, different communication methods are used in the present application based on the type of data to be transmitted.

Figure 5:
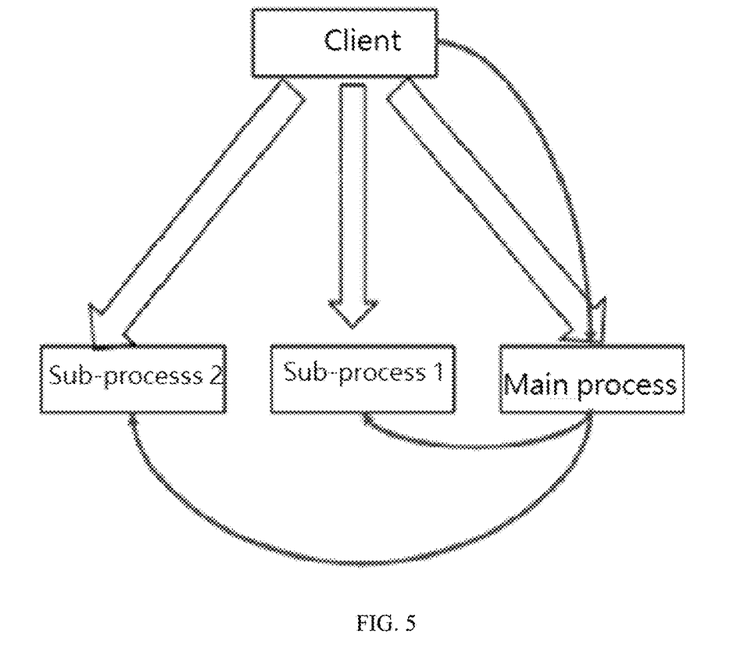
FIG. 5 is a structure schematic diagram of a unilateral primitive transmission provided in the present application.

A type of data transmitted by the client to the server node is first determined. If it is a preset type (which may be, but is not limited to, a type of control message), then the message corresponding to the type is determined to be a small message. The client is controlled to transmit data to the main server node through the bilateral primitive, and then the main server node is controlled to transmit data to the sub-server nodes. Please refer to FIG. 5. The thin arrows in FIG. 5 represent transmission paths of the control message.

If it is not the preset type (which may be, but is not limited to not the type of control message), it is determined to be a large block of message. The client is controlled to transmit data to the server nodes through the unilateral primitive. Please refer to FIG. 5. The wide arrows in FIG. 5 represent transmission paths of other types of messages, the transmission method of which is the same as the transmission method of the above large block of message and will not be repeated herein.

It may be seen from the above that determining the type of data to determine different data transmissions may reduce the CPU occupation and accelerate data transmission speed and efficiency.

Figure 6:
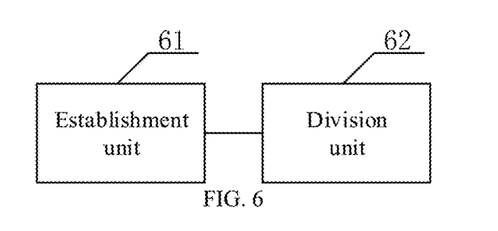
FIG. 6 is a structure block diagram of a communication system provided in the present application.

Please refer to FIG. 6, which is a structure block diagram of a communication system provided in the present application. The system is applied to a distributed storage system. The distributed storage system includes a client and a plurality of server nodes. The system includes:
- an establishment unit 61 for establishing a first network stack and a second network stack; and
- a division unit 62 for dividing all connection relationships between the client and each server node and between processes of any two server nodes to obtain a first connection relationship and a second connection relationship, so that communications between the client and each server node and between processes of any two server nodes are based on a corresponding connection relationship.

The first connection relationship is established based on the first network stack, and the second connection relationship is established based on the second network stack.

A number of first connection relationships or second connection relationships is related to a number of quantization parameters (QPs).

In order to solve the above technical problems, the present application also provides a communication system. For an introduction of the communication system, please refer to the above embodiments, which will not be repeated herein.

Figure 7:
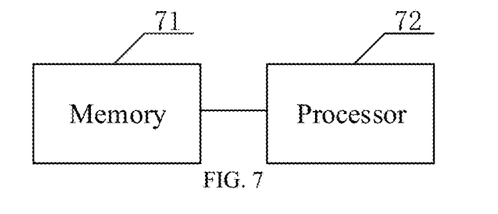
FIG. 7 is a structure block diagram of a communication apparatus provided in the present application.

Please refer to FIG. 7, which is a structure block diagram of a communication apparatus provided in the present application. The apparatus includes:
- a memory 71 for storing a computer program; and
- a processor 72 for implementing steps of the above communication method when the computer program is stored.

In order to solve the above technical problems, the present application also provides a communication apparatus. An introduction of the communication apparatus may be referred to the above embodiments, and will not be repeated herein.

In order to solve the above technical problems, the present application also provides a non-transitory computer-readable storage medium. The non-transitory computer-readable storage medium stores a computer program. The computer program implements steps of the above communication method when executed by the processor. An introduction of the non-transitory computer-readable storage medium may be referred to the above embodiments, and will not be repeated herein.

Figure 8:
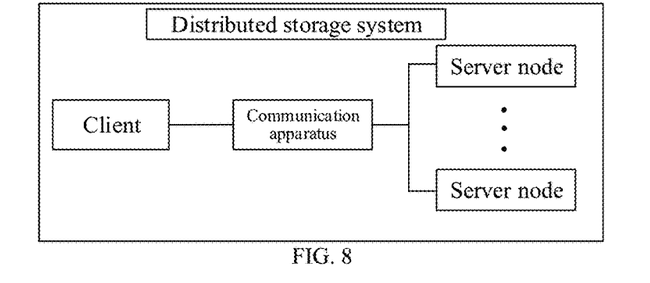
FIG. 8 is a structure block diagram of a distributed storage system provided in the present application.

Please refer to FIG. 8. FIG. 8 is a structure block diagram of a distributed storage system provided in the present application. The distributed storage system includes a client, a plurality of server nodes and the above communication apparatus. An introduction of the distributed storage system may be referred to the above embodiments, and will not be repeated herein.

Each embodiment in this specification is described in a progressive manner, each embodiment focuses on the difference from other embodiments, and the same and similar parts of each embodiment may be referred to each other. It should also be noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, method, article, or terminal device including a plurality of elements includes not only those elements but also includes other elements not expressly listed, or also includes elements inherent to such a process, method, article, or device. In the absence of further limitation, an element defined by the phrase "including a . . . " does not exclude the presence of additional identical element in the process, method, article, or terminal device.

The above description of the disclosed embodiments enables those skilled in the art to implement or use the present application. Various modifications to these embodiments will be readily apparent to those skilled in the art, and the general principles defined herein may be implemented in other embodiments without departing from the spirit or scope of the application.

Therefore, the present application will not be limited to the embodiments shown herein, but is to conform to the widest scope consistent with the principles and novel features disclosed herein.

The invention claimed is:

1. A communication method applied to a distributed storage system, wherein the distributed storage system comprises a client and a plurality of server nodes, and the method comprises:
   establishing a first network stack and a second network stack; and
   dividing all connection relationships between the client and each server node and between processes of any two server nodes to obtain a first connection relationship and a second connection relationship, so that communications between the client and each server node and between processes of any two server nodes are based on a corresponding connection relationship;
   wherein the first connection relationship is established based on the first network stack, and the second connection relationship is established based on the second network stack; and
   a number of first connection relationships or a number of second connection relationships is related to a number of quantization parameters (QPs).

2. The method according to claim 1, the dividing all connection relationships between the client and each server node and between processes of any two server nodes to obtain the first connection relationship and the second connection relationship, so that communications between the client and each server node and between processes of any two server nodes are based on a corresponding connection relationship, comprises:
   dividing a connection relationship between the client and each server node into the first connection relationship, so that communication between the client and each server node is based on the first connection relationship; and
   dividing a connection relationship between processes of any two server nodes into the second connection relationship, so that communication between processes of any two server nodes is based on the second connection relationship.

3. The method according to claim 2, wherein the number of first connection relationships established based on the first network stack is related to the number of QPs, and the number of second connection relationships established based on the second network stack is not related to the number of QPs.

4. The method according to claim 3, wherein the first network stack is an RDMA network stack and the second network stack is a Posix network stack.

5. The method according to claim 2, wherein the distributed storage system further comprises a monitoring terminal for monitoring an operating state of each server node, and the method further comprises:
   dividing a connection relationship between the monitoring terminal and each server node into the first connection relationship, so that the monitoring terminal monitors each server node based on the first connection relationship.

6. The method according to claim 5, wherein the monitoring terminal is a display.

7. The method according to claim 2, wherein the first network stack is an RDMA network stack, and
   after the dividing a connection relationship between the client and each server node into the first connection relationship, so that the communication between the client and each server node is based on the first connection relationship, the method further comprises:
   determining an amount of data transmitted between the client and the server nodes;
   determining whether the amount of data is within a preset range;
   controlling the client to transmit data to each server node through a bilateral primitive when the amount of data is within the preset range; and
   controlling the client to transmit data to all server nodes through a unilateral primitive when the amount of data is not within the preset range.

8. The method according to claim 7, wherein the server nodes comprise a main server node and a plurality of sub-server nodes, and
   the controlling the client to transmit data to each server node through the bilateral primitive, comprises:
   controlling the client to transmit data to the main server node through the bilateral primitive, and then controlling the main server node to transmit data to the sub-server nodes.

9. The method according to claim 7, wherein before the controlling the client to transmit data to all server nodes through the unilateral primitive, the method further comprises:
   controlling the client to send its own memory address and secret key to each server node through the bilateral primitive; and
   controlling each server node to pull data from the memory address corresponding to the client based on the memory address and the secret key for data transmission between the client and each server node.

10. The method according to claim 7, after the controlling each server node to pull data from the memory address corresponding to the client based on the memory address and the secret key, the method further comprises:
    storing the pulled data in a memory address of each server node corresponding to the data.

11. The method according to claim 7, wherein the preset range is less than 64 kb.

12. The method according to claim 7, wherein the controlling the client to transmit data to all server nodes through the unilateral primitive comprises:
    controlling all server nodes to pull data from the client.

13. The method according to claim 2, wherein the first network stack is an RDMA network stack, and
    after the dividing the connection relationship between the client and each server node into the first connection relationship, so that communication between the client and each server node is based on the first connection relationship, the method further comprises:
    determining a type of data transmitted by the client to the server nodes;
    determining whether the type of data is a preset type;
    controlling the client to transmit the preset type of data to the server nodes through a bilateral primitive when the type of data is the preset type; and
    controlling the client to transmit the preset type of data to all server nodes through a unilateral primitive when the type of data is not of the preset type.

14. The method according to claim 2, wherein the number of first connection relationships established based on the first network stack is not related to the number of QPs, and the number of second connection relationships established based on the second network stack is related to the number of QPs.

15. The method according to claim 1, wherein the method further comprises:

initializing the first network stack and the second network stack at startup of the distributed storage system.

16. The method according to claim 15, wherein the method further comprises:
obtaining an accessed network segment detected by a first thread group corresponding to the first network stack and the second network stack at a phase of establishing a connection relationship; and
determining a target network stack from the first network stack and the second network stack based on the network segment.

17. A communication apparatus, comprising:
a memory for storing a computer program; and
a processor for implementing steps of the method according to claim 1 when the computer program is stored.

18. A distributed storage system, comprising a client, a plurality of server nodes and the communication apparatus according to claim 17.

19. A non-transitory computer-readable storage medium, wherein the non-transitory computer-readable storage medium stores a computer program which implements steps of the method according to claim 1 when executed by a processor.

20. A communication system applied to a distributed storage system, wherein the distributed storage system comprises a client and a plurality of server nodes, and the communication system comprises:
an establishment unit for establishing a first network stack and a second network stack; and
a division unit for dividing all connection relationships between the client and each server node and between processes of any two server nodes to obtain a first connection relationship and a second connection relationship, so that communications between the client and each server node and between processes of any two server nodes are based on a corresponding connection relationship;
wherein the first connection relationship is established based on the first network stack, and the second connection relationship is established based on the second network stack; and
a number of first connection relationships or a number of second connection relationships is related to a number of quantization parameters (QPs).

* * * * *